United States Patent [19]

Hanson

[11] 4,375,701
[45] Mar. 1, 1983

[54] BATTERY OR AC DRIVEN RADIO RECEIVER POWER SUPPLY

[75] Inventor: Raymond F. Hanson, Whitesboro, N.Y.

[73] Assignee: General Electric Company, New York, N.Y.

[21] Appl. No.: 169,658

[22] Filed: Jul. 17, 1980

[51] Int. Cl.³ .............................................. H02J 9/06
[52] U.S. Cl. .................................. 455/343; 455/127; 328/260; 307/23; 307/64
[58] Field of Search ............... 455/343, 127, 117, 217; 328/258, 260, 264; 307/64, 66, 71, 18, 22, 23, 26, 29, 80, 85, 86

[56] References Cited

U.S. PATENT DOCUMENTS

| | | | |
|---|---|---|---|
| 2,796,520 | 6/1957 | Kreithen | 328/260 |
| 3,267,288 | 8/1966 | Maiden | 307/66 |
| 3,308,306 | 3/1967 | Bagno | 307/66 |
| 3,819,980 | 6/1974 | Mullersman | 307/66 |
| 4,150,302 | 4/1979 | Roche | 307/66 |
| 4,200,872 | 9/1980 | Fahey | 307/66 |
| 4,209,710 | 6/1980 | Quarton | 307/66 |
| 4,225,792 | 9/1980 | Fahey | 307/66 |

*Primary Examiner*—Tommy P. Chin
*Attorney, Agent, or Firm*—John R. Rafter; Carlos Nieves; George R. Powers

[57] ABSTRACT

In a radio receiver adapted to be operable from an AC source or a battery, the battery is connected in series with radio circuits and a silicon transistor which operates as a switch. The receiver includes a circuit which responds to an AC source to make DC voltage available to the radio circuits and to keep the transistor in an off state. When the radio is not connected to an AC source and the receiver is turned on, the silicon transistor is driven fully on. Since only a small voltage drop exists across the transistor, energy is efficiently transferred to the radio circuits.

14 Claims, 1 Drawing Figure

BATTERY OR AC DRIVEN RADIO RECEIVER POWER SUPPLY

BACKGROUND OF THE INVENTION

1. Field of the Invention

The subject invention relates to electronic devices capable of operating, selectively, from a battery or an AC source.

2. Description of Prior Art

In a known radio receiver design an electrical plug and cord set is used to couple AC power to a DC power supply circuit used to supply power to electronic radio circuits of the receiver. The output of the power supply is connected to a terminal of an ON-OFF switch, which controls the ON-OFF state of the radio circuits, and to a diode connected in series with a battery. The output voltage of the power supply, with respect to the battery, and the orientation of the diode are selected to reverse bias the diode when the power supply is drawing power from an AC source. As a result, in this mode of operation no current is drawn from the battery. Alternatively, if the plug is not connected to an AC source or if the AC source fails, the battery can supply power to the radio circuits. In the battery mode of operation, the maximum voltage available to the radio circuits is equal to the voltage supplied by the battery less the forward bias voltage drop across the diode. To use the available battery energy efficiently it is desirable to have as small a voltage drop as is possible across the diode. Since germanium diodes or germanium transistors connected to function as diodes have a cut-in voltage of 0.2 volts and corresponding silicon devices have a cut-in voltage of about 0.6 volts, the use of a germanium device in the described circuit is preferred. The preference, however, is under pressure because the price of germanium devices is increasing rapidly and availability is decreasing.

SUMMARY OF THE INVENTION

It is an object of the present invention to provide a radio receiver having an inexpensive power supply which efficiently provides DC voltage from a battery to radio circuits or provides, at the option of an operator, a DC voltage to the radio circuits from an AC source.

Briefly, the invention herein may be described as a radio receiver having an electronic circuit and a power supply adapted to selectively receive primary power from a battery or an AC source. The power supply includes: a switch having first and second terminals, the second terminal being coupled to a common potential member by the electronic circuit; a silicon transistor; and a pair of contacts for engaging the battery, one of the contacts being coupled to the common potential member and the other of the contacts being coupled by the emitter and collector electrodes of the transistor to the first terminal. A diode couples the first terminal to the AC source and an AC bypass capacitor couples the first terminal to the common potential member. The supply also includes means for turning the transistor fully on when the switch is closed and battery operation of the radio is selected and for turning the transistor off when operation of the radio from the AC source is selected.

BRIEF DESCRIPTION OF THE DRAWING

The above-mentioned and other objects and features of the invention will become apparent by reference to the following description in conjunction with the accompanying FIGURE, which is a schematic drawing of a radio receiver according to the invention.

DESCRIPTION OF A PREFERRED EMBODIMENT

Figure 1:
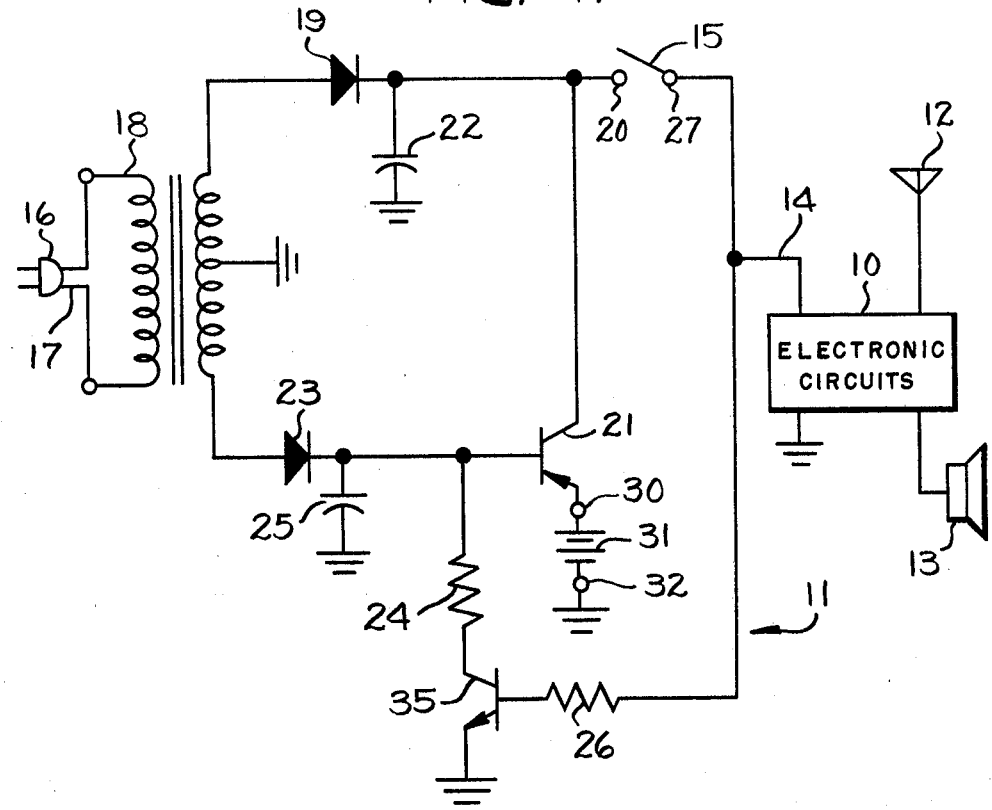

Referring to the FIGURE, a radio receiver according to the invention includes an electronic circuit 10 and a power supply 11.

Electronic circuit 10 includes radio circuits responsive to modulated signals received by an antenna 12 to provide, via speaker 13 audible sounds. While circuit 10 can take on many forms, a preferred arrangement includes the use of an AM/FM integrated circuit such as is manufactured under part number T900BI-K by Tokyo Shibaura Electric Co. and associated tuning elements. As will appear, the circuit 10 receives DC power to operate, via a wire 14 when ON-OFF switch 15 is closed.

Power supply 11 includes a plug 16 suitable for engaging an AC source outlet, the plug being connected by an electrical cord 17 to the primary winding of a transformer 18. The transformer has a secondary winding having a tap, the tap being connected to a common potential member which in this embodiment is ground potential. One end of the secondary transformer winding is connected to the anode of a diode 19. The cathode of diode 19 is connected to a first terminal 20 of switch 15 to the collector electrode of a PNP silicon transistor 21, and to an end of a bypass capacitor 22. The other end of capacitor 22 is connected to ground. The other end of the secondary transformer winding is connected to the anode of a diode 23. The cathode of diode 23 is connected to the base electrode of transistor 21, to an end of a resistor 24 and to an end of a bypass capacitor 25. The other end of capacitor 25 is connected to ground and the other end of resistor 24 is connected to the collector electrode of an NPN transistor 35. The emitter electrode of transistor 35 is connected to ground and its base electrode is coupled by a resistor 26 and wire 14 to a second terminal 27 of switch 15. The emitter electrode of transistor 21 is connected to a contact 30 engageable with the positive terminal of a removable battery 31. The negative terminal of the battery is engageable with a contact 32 which is connected to ground potential.

In the circuit described, with battery 31 in the circuit and switch 15 open, if plug 16 is connected to an AC source a positive DC voltage is provided at the base electrode of transistor 21. The magnitude of this voltage depends upon the amplitude of the voltage supplied by the AC source, and the turns ratio between the primary winding and the number of turns in the secondary between the tap and the anode of diode 23. In practice the turns ratio is selected to provide a DC voltage at the base which keeps the base-emitter diode of the transistor reverse biased when the lowest expected AC voltage is applied. It should be appreciated that under the described circumstances battery 31 does not supply any power. With plug 16 connected to an AC source, battery 31 in the circuit, and switch 15 is closed, the diode 19, capacitor 22, and the resistive load between the cathode of the diode and ground cooperate with the transformer to provide a DC voltage on wire 14.

When battery operation is desired, plug 16 is removed from the AC source outlet. With the plug removed, if switch 15 is open capacitors 22 and 25 charge to a value substantially equal to the terminal voltage of battery 31 and conduction ends. However, when switch 15 is closed the positive voltage on the capacitors turn transistor 35 on and transistor 21 is turned on. With transistor 21 fully on, the emitter to collector electrode drop is of the order of 0.2 volts and, therefore, the voltage which appears on wire 14 when switch 15 is closed is substantially the terminal voltage of the battery. In this mode of operation the current drawn by transistor 35 is small and, therefore, the circuit described uses battery power almost as efficiently as the power supply described before in connection with the prior art. Significantly, the circuit does not require the use of germanium semiconductors to operate efficiently.

Typical circuit values or components which are useful when battery 31 provides 6 volts are:

| Capacitors | Values |
|---|---|
| 22 | 470 uf |
| 25 | 47 uf |
| Resistors | Values |
| 24 | 1.8 Kohms |
| 26 | 160 Kohms |
| Transistors | Type |
| 21 | EL262 |
| 35 | 2N3826 |
| Diodes | Type |
| 19, 25 | 1N4002 |

The radio receiver described above may be modified by persons skilled in the electronic arts in ways which are consistent with the spirit of the invention. Therefore, it should be understood that the description herein of a preferred embodiment, according to the invention, has been set forth as an example thereof and should not be construed or interpreted to limit the scope of the claims which follow and define the invention.

What is claimed is:

1. A power supply circuit for supplying power to an audio electronic circuit alternatively from an A.C. source or a battery comprising:
    a switch having first and second terminals, said second terminal having means for coupling to said audio electronic circuit;
    a first transistor having collector, base and emitter electrodes,
    a contact for engaging a battery terminal being selectably coupled by said emitter and collector electrodes of said first transistor to said switch first terminal;
    a first diode for coupling the switch first terminal to a means for supplying A.C. potential;
    means coupled between said switch second terminal and said first transistor base for turning said first transistor fully on when said switch is closed.
2. The audio electronic power supply circuit of claim 1 further including means coupled between said means for supplying A.C. potential and said base of said first transistor fully for turning said first transistor off.
3. The audio electronic power supply circuit of claim 2 wherein said means for turning said first transistor fully off comprises:
    a second diode connected between said means for supplying A.C. potential and said base of said base of said first transistor.
4. The audio electronic power supply circuit of claim 3 wherein said means for supplying A.C. potential comprises:
    a transformer having a primary winding adapted for connection to said A.C. source, and a tapped secondary winding having first and second end terminals connected to said first and second diodes.
5. The audio electronics power supply circuit of claim 3 further comprising:
    first and second bypass capacitors being respectfully adapted for connection between said first and second diode outputs and first and second predetermined potentials.
6. The audio electronic power supply circuit of claim 3 wherein said second diode is connected in opposition to said first transistor base emitter junction.
7. The audio electronic power supply circuit of claim 1 wherein said means for turning the first transistor fully on includes a second transistor, the base electrode of the first transistor being coupled to the collector electrode of the second transistor by a resistance, and the emitter electrode of the second transistor being adapted for connection to a potential which enables said first transistor be turned on.
8. The audio electronic power supply circuit of claim 7 wherein the base of said second transistor is connected to said switch second terminal, whereby said second transistor is turned on whenever said switch is closed and said electronic circuit receives power.
9. The audio electronic power supply circuit of claim 8 further including a first capacitor connected between the output of said first diode and a means for supplying a predetermined potential, said capacitor being a bypass capacitor for said diode output and additionally being a means for storing a potential to turn said second transistor on when said means for supplying an A.C. potential is disconnected and said switch is closed.
10. An audio electronic power supply circuit of claim 1 wherein said first transistor is a silicon transistor.
11. An electrical power supply circuit operable from either A.C. or D.C. power source, comprising a switch having a second terminal adapted for connection to a load and a first terminal adapted for parallel connection to an A.C. circuit branch and a D.C. circuit branch,
    a first controllable electronic means connected in said D.C. branch between said switch first terminal and a contact for connection to said D.C. source said first controllable electronic means having a control electrode;
    circuit means for supplying a first potential during A.C. operation and a second potential during D.C. operation, including a second controllable electronic means coupled to said control electrode of said first electronic means, said second electronic means includes a control electrode connected to said switch second terminal for receiving a turn on bias potential whenever said load receives power,
    whereby said first potential turns said first electronic means off and said second potential turns said first electronic means on.
12. The electronic power supply circuit of claim 11 wherein said controllable electronic means comprises:
    a first transistor having its emitter and collector connected between said D.C. contact and said switch first terminal and its base connected to said circuit means for controllably supplying said first and second potentials.
13. The electronic power supply circuit of claim 11 wherein said A.C. circuit branch includes a transformer having a primary coil and a tapped secondary coil, said primary coil having means adapted for connection to said A.C. source and said secondary coil having a first terminal connected through a diode and a bypass capacitor to said switch first terminal.

14. The electronic power supply circuit of claim 13 wherein said circuit means includes a diode and bypass capacitor connected between a second terminal of said secondary coil and said control electrode of said first electronic means for supplying said first potential to said control electrode for turning said electronic means off during operation from an A.C. source.

* * * * *